United States Patent [19]
Asano et al.

[11] Patent Number: 5,233,887
[45] Date of Patent: Aug. 10, 1993

[54] QUICK RETURN MECHANISM FOR A DRILLING MACHINE

[75] Inventors: Osamu Asano; Michihiro Shoji, both of Tokyo, Japan

[73] Assignee: Nitto Kohki Co., Ltd., Tokyo, Japan

[21] Appl. No.: 928,022

[22] Filed: Aug. 11, 1992

[30] Foreign Application Priority Data

Aug. 27, 1991 [JP] Japan .................. 3-240588
Aug. 27, 1991 [JP] Japan .................. 3-240589

[51] Int. Cl.⁵ .............................................. F16H 5/72
[52] U.S. Cl. ............................... 74/810.1; 74/84 R; 74/333; 74/421 A; 192/71
[58] Field of Search ............... 74/84 R, 333, 421 A, 74/810.1; 192/71, 72

[56] References Cited

U.S. PATENT DOCUMENTS

3,927,580 12/1975 Fawcett .................. 74/810.1
3,962,935 6/1976 Hutton et al. ............ 74/810.1

FOREIGN PATENT DOCUMENTS

0077766 8/1982 European Pat. Off. .
1602994 7/1971 Fed. Rep. of Germany .
4037909A1 6/1991 Fed. Rep. of Germany .
56-63156 5/1981 Japan .................. 74/810.1
1-240210 3/1989 Japan .

Primary Examiner—Allan D. Herrmann
Assistant Examiner—William O. Trousdell
Attorney, Agent, or Firm—Nixon & Vanderhye

[57] ABSTRACT

A quick return mechanism for a drilling machine comprises an input shaft, an output shaft, an overdrive gear train and a speed-reduction gear train, each disposed between the input and output shafts, a first clutch for connecting the output shaft to the input shaft through the over-drive gear train when a motor for driving the input shaft rotates in the quick-return direction and disconnecting the output shaft from the input shaft when the motor rotates in the feed direction, a second clutch selectively set at a first position and a second position, for connecting the output shaft to the input shaft through the speed-reduction gear train at the first position when the motor is rotated in the feed direction, and disconnecting the output shaft from the input shaft through the speed-reduction gear train at the second position, when the motor rotates in the quick-return direction, and a rotation=linear-movement converting unit for setting the second clutch at the first position when the motor rotates in the feed direction, and at the second position when the motor rotates in the quick-return direction.

5 Claims, 4 Drawing Sheets

TO HARMONIC
DRIVE MECHANISM

TO HARMONIC DRIVE MECHANISM

TO HARMONIC
DRIVE MECHANISM

FIG.10
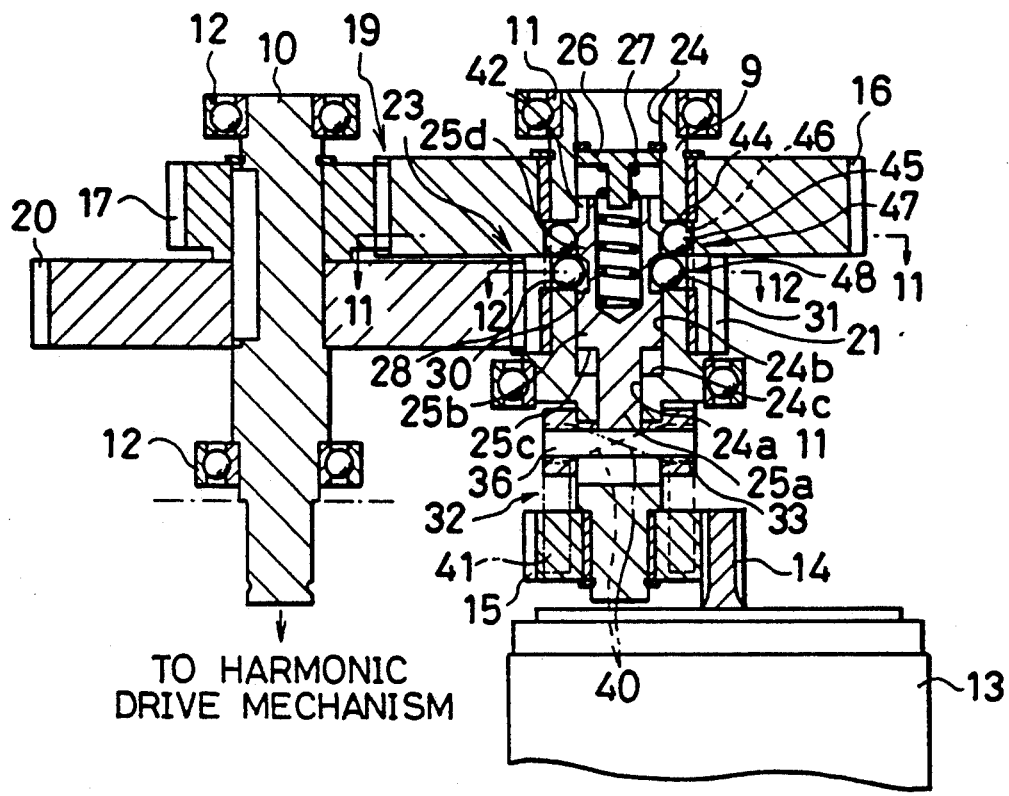
TO HARMONIC DRIVE MECHANISM
FIG.11
FIG.12
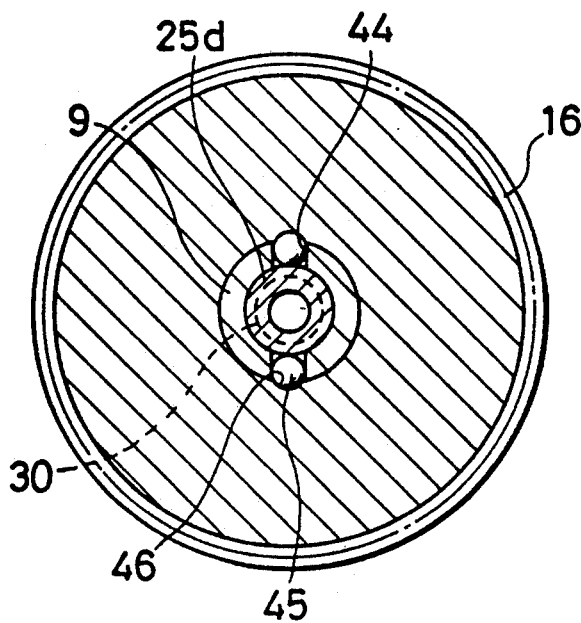

QUICK RETURN MECHANISM FOR A DRILLING MACHINE

BACKGROUND OF THE INVENTION

1. Field of the Invention

This invention relates to a quick return mechanism used in a drilling machine for carrying out an automatic feed operation and an automatic quick return operation of the electric drill of the drilling machine.

2. Description of the Related Art

The automatic feed operation and automatic return operation of a conventional drilling machine are performed by changing the rotational directions of a feed motor. The rotational speed of the feed motor is controlled by voltage regulation such that the electric drill is lowered slowly in the feed operation and raised in the quick return operation. However, the speed at which the electric motor can perform quick return is limited when the feed motor is voltage-controlled.

The recent phenomenon of labor shortage has placed a high priority on working efficiency. In this regard, it is desirable that the return speed of the electric drill of a drilling machine after completing drilling work be greatly increased.

The Japanese Unexamined Patent Application Publication No. 1-240210 discloses a quick return mechanism for a drilling machine, which comprises a one-way clutch provided at the input side of a high reduction unit and an engaging clutch provided at the output side thereof. The engagement clutch comprises two clutch pieces each having an inclined surface engaging the other inclined surface. When a predetermined torque is applied, the clutch pieces slide against each other on their inclined surfaces so as to be disengaged from each other. The driving force of the feed motor in the feed operation is transmitted along a different route from that in the quick return operation. Using this arrangement, therefore, the above-mentioned conventional problem is overcome to some extent.

In this prior art, however, sliding of both clutch pieces is likely to cause unstable operation of the engaging clutch.

SUMMARY OF THE INVENTION

The object of this invention to provide a quick return mechanism for a drilling machine which provides increased electric drill return speed of an electric drill by way of a simple structure and performs accurate changing of the speed of the electric drill.

In order to achieve this object, a quick return mechanism for a drilling machine according to this invention comprises:

- a motor rotatable in a feed direction and a return direction opposite thereto;
- an input shaft adapted to be rotated by the motor;
- an output shaft rotatably provided in parallel to the input shaft;
- an over-drive gear train comprising a first large gear coaxially mounted on the input shaft and a first small gear coaxially mounted on the output shaft and engaging the first large gear;
- a speed-reduction gear train comprising a second small gear coaxially mounted on the input shaft and a second large gear coaxially fixed to the output shaft and engaging the second small gear;
- a rotation=linear-movement converting unit rotated by the motor and rotating the input shaft, for converting rotation to linear movement therealong;
- a first clutch for connecting the output shaft to the input shaft through the over-drive gear train when the input shaft rotates in the quick-return direction; and
- a second clutch movable between a first position and a second position, for connecting the second small gear to the input shaft at the first position in the feed operation and disengaging the second small gear from the input shaft at the second position in the return operation.

When the motor rotates in the feed direction, the second clutch is set at the first position by the rotation=linear-movement converting unit to connect the second small gear to the input shaft. The rotation of the input shaft is transmitted from the input shaft to the output shaft through the speed-reduction gear train and lowers the slide plate of the drilling machine slowly, thereby giving drilling feed to the electric drill. Upon completion of the drilling by the electric drill, the motor is reversed to rotate in the quick-return direction. Then, the second clutch is set at the second position by the rotation=linear-movement converting unit to disengage the second small gear from the input shaft, thereby preventing the rotation of the input shaft from being transmitted to the output shaft through the speed reduction gear train. In this case, the first clutch is on, and the rotational speed of the input shaft is increased and transmitted to the output shaft through the over-drive gear train. Thus, the output shaft is rotated at a high speed in the quick-return direction such that the slide plate is rapidly raised to cause the electric drill return quickly.

BRIEF DESCRIPTION OF THE DRAWINGS

This invention will fully be understood from the following detailed description by way of the preferred embodiments with reference to the accompanying drawings in which:

FIG. 10 is a horizontal cross-sectional view of the second embodiment of the quick return mechanism according to this invention, in the quick-return operation;

FIG. 11 is a cross-sectional view taken along line 11—11 of FIG. 10; and

FIG. 12 is a cross-sectional view taken along line 12—12 of FIG. 10.

DETAILED DESCRIPTION OF THE PREFERRED EMBODIMENTS

Figure 1:
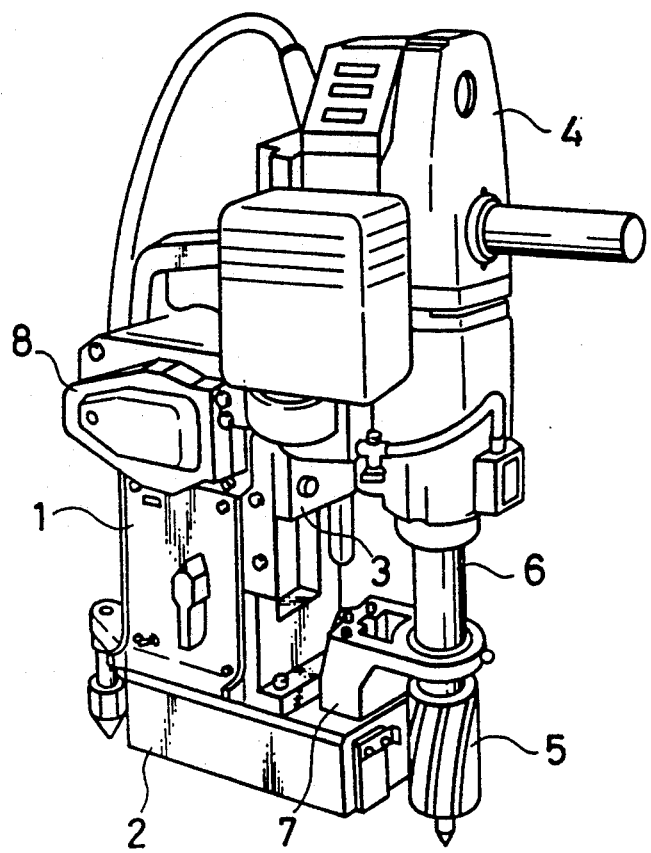
FIG. 1 is a perspective view of the overall drilling machine provided with a quick return mechanism according to this invention.

As shown in FIG. 1, a quick return mechanism according to this invention is housed in a drilling machine which includes a drilling machine body 1 having a lower magnet base 2, a slide plate 3 provided on the front wall of the body 1 so as to be slidable vertically, and an electric drill 4 held on the slide plate 3.

The electric drill 4 has a downward extending annular tool 5 fixed to the spindle 6 of the electric drill 4, which spindle is driven at a high speed by an electric motor (not shown). The annular tool 5 is held so as to be movable vertically by a bracket 7 extending horizontally and forward from the front upper portion of the magnet base 2. Provided on a side wall of the drilling machine body 1 is a gear box 8 which contains an electric motor (not shown) for moving the slide plate 3 upward and downward, and other necessary elements (not shown) as well.

In FIGS. 2 to 6 is shown the first embodiment of a quick return mechanism according to this invention.

Figure 2:
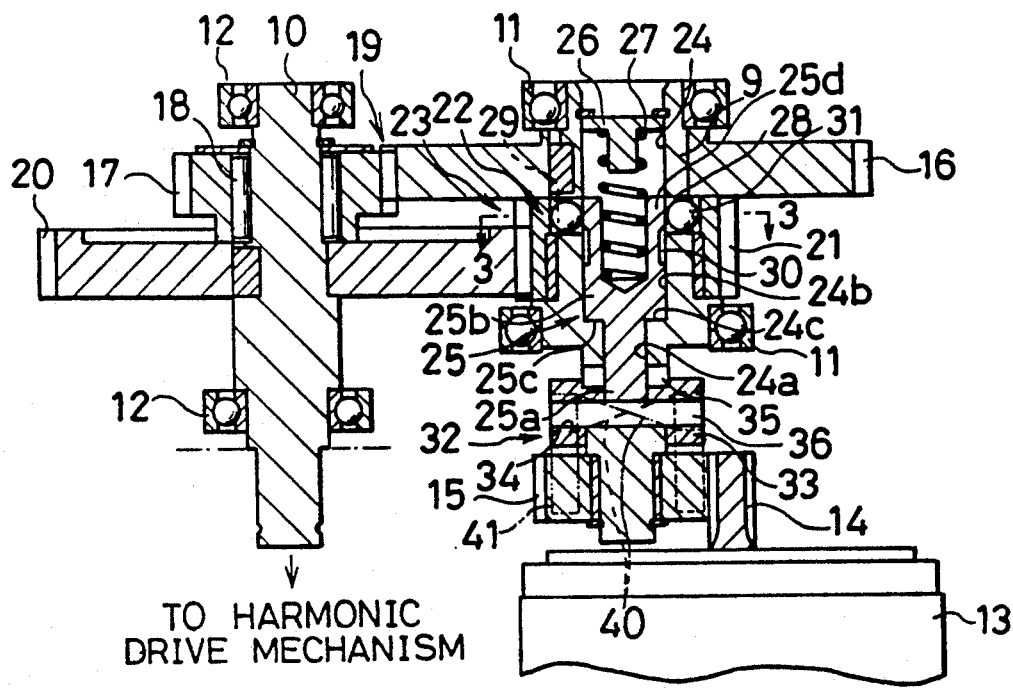
FIG. 2 is a horizontal cross-sectional view of the first embodiment of a quick return mechanism according to this invention, in the feed operation.

FIG. 2 is a horizontal cross-sectional view of the first embodiment in the feed operation. An input shaft 9 and an output shaft 10 are rotatably provided on the inner wall of the housing of the drilling machine body 1 by respective bearings 11 and 12. An input gear 15, which engages a pinion 14 formed on the rotary shaft of a reversible electric motor 13, is coaxially and rotatably mounted on the input shaft 9. However, the input shaft 9 is adapted to be selectively rotated in the feed direction and in the quick-return direction by the electric motor 13 through the input gear 15 and a rotation=linear-movement converting unit which will be described later.

A first large gear 16 is coaxially fixed to the input shaft 9, and a first small gear 17 engaging the first large gear 16 is coaxially mounted on the output shaft 10 through a one-way clutch 18 which constitutes a first clutch.

The one-way clutch 18 connects the first small gear 17 to the output shaft 10 when the first large gear 16 is rotated by the input shaft 9 in the quick-return direction, and disengages the first small gear 17 from the output shaft 10 such that the gear 17 rotates idly with respect to thereto when the first large gear 16 is rotated in the feed direction together with the input shaft 9. The free end of the output shaft 10 is connected to an over-drive mechanism such as a harmonic drive mechanism (not shown) so as to move the slide plate 3 vertically. In this arrangement, the first large gear 16 and the first small gear 17 constitute an over-drive gear train 19.

A second large gear 20 is coaxially fixed to the output shaft 10, and a second small gear 21 engaging the second large gear 20 is mounted coaxially on the input shaft 9 through a displacing clutch 22 which comprises a second clutch. The second large gear 20 and the second small gear 21 constitute a speed-reduction gear train 23.

The displacing clutch 22 will now be described.

An axial bore 24 extends through the input shaft 9 from the free end opposite to the end thereof at the side of the electric motor 13 to an intermediate portion of the same. The portion of the axial bore 24 at the side of the electric motor 13 forms a small inner-diameter portion 24a, while the portion at the free end forms a large inner-diameter portion 24b. The portion between the portions 24a and 24b defines a stepped portion 24c.

In the axial bore 24 is inserted a slide rod member 25 which comprises a small outer-diameter portion 25a having an outer diameter substantially equal to the inner diameter of the small inner-diameter portion 24a of the axial bore 24, a large outer-diameter portion 25b having an outer diameter substantially equal to the inner diameter of the large inner-diameter portion 24b of the axial bore 24 and a stepped portion 25c bridging the portions 25a and 25b. The slide rod member 25 is always urged toward the electric motor 13 by a compression coil spring 27 disposed between the large outer-diameter portion 25b of the slide rod member 25 and a supporting ring 26 fixed to the inner peripheral portion of the free end of the axial bore 24. As shown in FIG. 2, the stepped portion 25c of the slide rod member 25 contacts the stepped portion 24c of the axial bore 24 during the feed operation.

Figure 4:
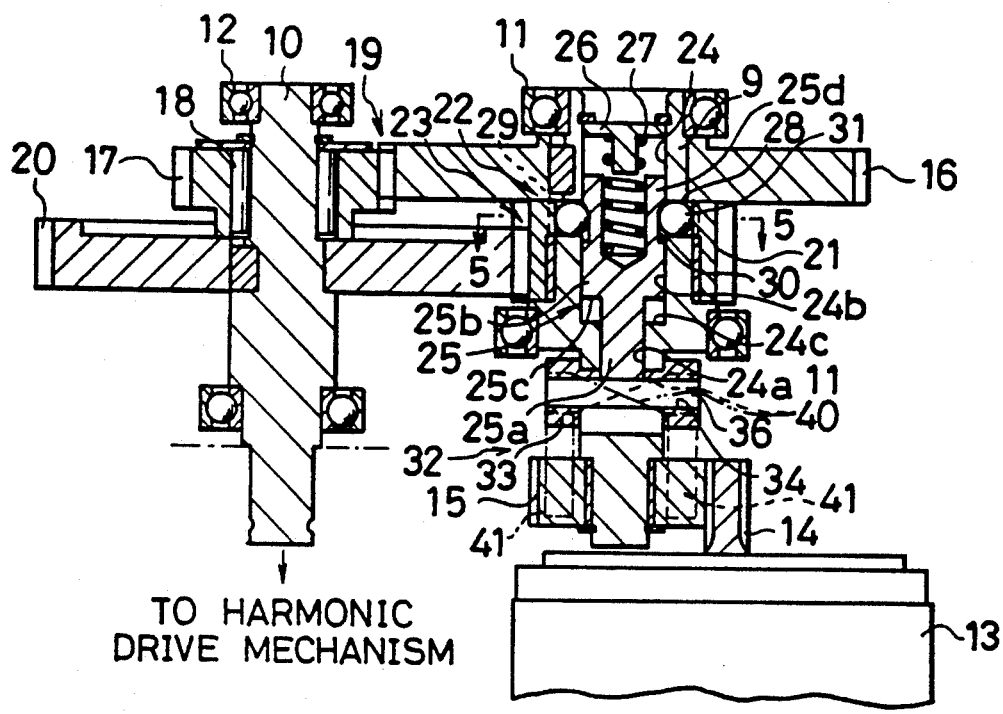
FIG. 4 is a horizontal cross-sectional view of the first embodiment of the quick return mechanism according to this invention, in the quick-return operation.

Referring to FIGS. 2 to 5, a pair of diametrically opposed transverse hole portions 28 pass through the wall portions of the input shaft 9 which face the inner peripheral wall of the second small gear 21. A pair of diametrically opposed depressed engaging portions 29 are formed in the portions of the inner peripheral wall of the second small gear 21 which face the region of the transverse hole portions 28. An annularly grooved engaging portion 30 is formed in that portion of the large outer-diameter portion 25b of the slide rod member 25 which is closer to the electric motor 13 than the transverse hole portions 28 (FIGS. 2 and 4).

Figure 3:
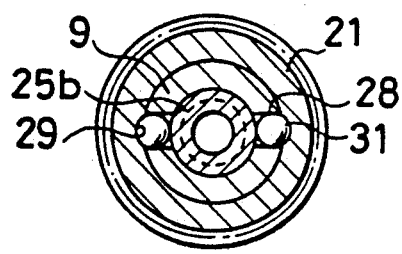
FIG. 3 is a cross-sectional view taken along line 3—3 of FIG. 2.
Figure 5:
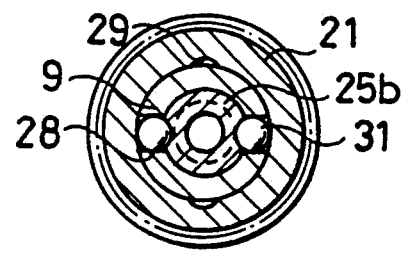
FIG. 5 is a cross-sectional view taken along line 5—5 of FIG. 4.

In each transverse hole portion 28 is fitted a ball 31 which has a smaller outer diameter than the inner diameter of the respective transverse hole portion 28. As shown in FIGS. 2 and 3, during the feed operation, the balls 31 are pressed by a cylindrical clutch portion 25d forming the free end portion of the large outer diameter portion 25b of the slide rod member 25, and are fitted in the corresponding depressed engaging portions 29 so as to connect the second small gear 21 to the input shaft 9 (the position of the slide rod member 25 at this stage point being hereinafter referred to as the "first position"). On the other hand, as shown in FIGS. 4 and 5, during the quick-return operation, the balls 31 are received in the grooved engaging portion 30 to disengage the second small gear 21 from the input shaft 9 (the position of the slide rod member 25 at this point being hereinafter referred to as the "second position"). In other words, the displacing clutch 22 is set to be on during the feed operation, and set to be off during the quick-return operation. The clutch 22 is referred to as a displacing clutch because it is moved along the input shaft 9 so as to be set on and off according to the axial movement of the slide rod member 25, as described above.

Figure 6:
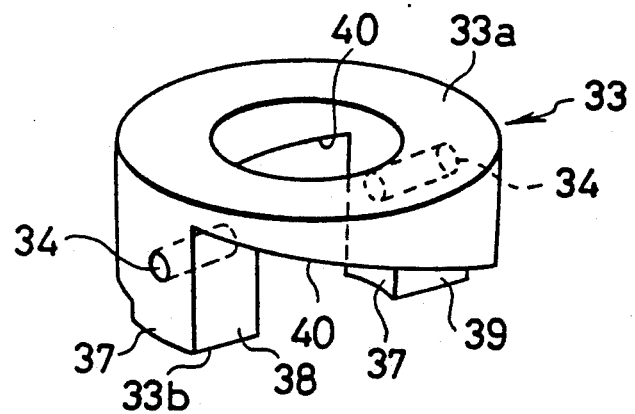
FIG. 6 is a perspective view of an embodiment of a slide ring used in the first and second embodiments of the quick return mechanisms according to this invention.

As shown in FIGS. 2, 4 and 6, a rotation=linear-movement converting unit 32 includes a slide ring 33 which has a pair of diametrically opposed transverse hole portions 34 extending radially therethrough. A pin 36 is inserted in the transverse hole portions 34 and a cross hole 35 formed in the input shaft 9 and having a larger width and extending along the axis of the input shaft 9, whereby the slide ring 33 is mounted on that portion of the outer peripheral wall of the input shaft 9 which is close to the electric motor 13, such that the slide ring 33 is movable axially and can rotate the input shaft 9. The free end of the small outer-diameter portion 25a of the slide rod member 25 is pressed against the lateral side of the pin 36 by the compression coil spring 27.

The slide ring 33 is provided, at one end 33b which is at the side of the electric motor 13, with a pair of diametrically opposed projecting portions 37 extending toward the electric motor 13. Each projecting portion 37 has two parallel planes 38 and 39 extending in parallel to the radial direction of the slide ring 33, with the respective transverse hole portion 34 disposed between the planes 38 and 39. The slide ring 33 further has a pair of axially symmetrical inclined cam face portions 40, each of which extends from the root portion of the plane 37 of one projecting portion 37 oriented in the feed direction to the root portion of the plane 38 of the other projecting portion 37 whose plane 38 is oriented in the opposite direction to the feed direction, in a manner gradually advancing toward the electric motor 13. The lift of each inclined cam face portion 40 is substantially equal to the distance between the first and second positions.

As shown in FIGS. 2 and 4, a pair of diametrically opposed parallel slide pins 41 extend from the input gear 15 toward the slide ring 33 and their tip ends slidably contact the corresponding inclined cam face portions 40 of the slide ring 33.

The end 33a of the slide ring 33 which is opposite to the end 33a thereof at the side of the electric motor 13 contacts the lateral side of the pin 36.

The operation of the first embodiment during the feed operation will now be described.

As the electric motor 13 first rotates in the feed direction, the input gear 15 is rotated in its feed direction through the pinion 14. The slide pins 41 are also rotated in the same direction as the input gear 15, with their tip ends sliding on the corresponding inclined cam face portions 40. Then, the slide pins 41 abut against the planes 39 of the slide ring 33 which are oriented in the opposite direction to the feed direction. At this point, the slide rod member 25 is moved to the first position through the slide ring 33 by the slide pins 41, with the result that the balls 31 are pushed by the clutch portion 25d into the depressed engaging portions 29, as shown in FIGS. 2 and 3. Thus, the second small gear 21 is connected to the input shaft 9, and the displacing clutch 22 is set on.

As the input gear 15 is further rotated in the feed direction by the electric motor 13, the slide ring 33 is rotated in its feed direction by the slide pins 41 which are in contact with the planes 39, and then the input shaft 9 is also rotated in its feed direction. The rotation of the input shaft 9 in the feed direction is reduced in speed and transmitted to the output shaft 10 through the displacing clutch 22 which is on, and the speed-reduction gear train 23 (i.e. second small gear 21 and the second large gear 20). At this point, the one-way clutch 18 is off and thus the first small gear 17 rotates idly about the output shaft 10, whereby the rotation of the input shaft 9 is not transmitted to the output shaft 10 through the over-drive gear train 19.

The speed-reduced rotation of the output shaft 10 lowers the slide plate 3 of the drilling machine slowly and allows the electric drill 4 to perform the drilling operation.

The quick-return operation of the first embodiment will now be described.

After the electric drill 4 has completed drilling work, the electric motor 13 rotates in the quick-return direction opposite to the feed direction, and the input gear 15 is also rotated in its quick-return direction. The slide pins 41 are now moved on the surface of the inclined cam face portions 40 from the plane 39, oriented in the direction opposite to the feed direction or in the quick-return direction, to the plane 38, oriented in the feed direction or in the direction opposite to the quick-return direction, and abut against the corresponding planes 38. At this point, the slide ring 33 is moved toward the electric motor 13 and the slide rod member 25 is moved to the second position by the compression coil spring 27. Thus, the balls 31 engage the grooved engaging portion 30 of the slide rod member 25, thereby to disengage the second small gear 21 from the input shaft 9. In other words, the displacing clutch 22 is set off. The second small gear 21 is rotated idly with respect to the input shaft 9, the rotation of which is not transmitted to the output shaft 10 through the speed-reduction gear train 23.

During the quick-return rotation of the input shaft 9, however, the one-way clutch 18 connects the first small gear 17 to the output shaft 10, as described above. The quick-return rotation of the input shaft 9 is increased in speed and transmitted to the output shaft 10 through the over-drive gear train 19 (i.e., the first large gear 16 and the first small gear 17). The output shaft 10, rotating at an increased rotational speed, lifts the slide plate 3 of the drilling machine rapidly, causing the electric drill 4 to return quickly.

In the first embodiment, let it be assumed that $N_1$ (in rpm in the leftward direction) is the rotational speed of the pinion 14 during the feed operation, $N_2$ (in rpm in the rightward direction) is the rotational speed of the pinion 14 during the quick-return operation, $i_1$ is the speed-reduction ratio between the pinion 14 and the input gear 15, $i_2$ is the speed-reduction ratio of the speed-reduction gear train 23, $i_3$ is the over-drive ratio of the over-drive gear train 19, $N_{if}$ is the rotational speed of the input shaft 9 in rpm in the rightward direction during the feed operation, $N_{of}$ is the rotational speed of the output shaft 10 in rpm in the leftward direction during the feed operation, $N_{ir}$ is the rotational speed of the input shaft 9 in rpm in the leftward direction during quick-return operation, and $N_{or}$ is the rotational speed of the output shaft 10 in rpm in the rightward direction during the quick-return operation.

Then, $$N_{if} = N_1/i_1$$

(in the rightward direction)

$$N_{of} = N_1/(i_1 \times i_2)$$

(in the leftward direction).

Further, $$N_{ir} = N_2/i_1$$

(in the leftward direction)

$$N_{or} = (N_2/i_1) \times i_3$$

(in the rightward direction).

The second embodiment of this invention will now be described with reference to FIGS. 7 to 12 as well as FIG. 6.

Along with an over-drive gear train 19, a first small gear 17 is coaxially fixed to an output shaft 10, and a first large gear 16 is coaxially and rotatably mounted on a input shaft 9.

A clutch for the over-drive gear train 19, i.e. a first clutch, and a clutch for the speed-reduction gear train 23, i.e. a second clutch, employ a common slide rod member 25, as described later. The slide rod member 25 is formed with a first annularly grooved engaging portion 42, a cylindrical clutch portion 25d having the same outer diameter as the large outer-diameter portion 25b of the slide rod member 25 and being the same as the clutch portion 25d of the first embodiment, and a second annularly grooved engaging portion 30 being as same as the grooved engaging portion 30 of the first embodiment, the elements 42, 25d and 30 being arranged in turn from that free end of the slide rod member 25 opposite to the end thereof at the side of the electric motor 13 toward the electric motor 13.

The input shaft 9 is provided with a pair of diametrically opposed first transverse hole portions 44 extending radially through the input shaft 9, and a pair of second transverse hole portions 28 being the same as the transverse hole portions 28 of the first embodiment, the hole portions 44 and 28 being arranged in turn from that end of the input shaft 9 opposite to the end thereof at the electric motor 13 toward the electric motor 13. Fitted in the first transverse hole portions 44 are balls 45 having a slightly smaller outer diameter than the inner diameter of the hole portions 44.

Figure 7:
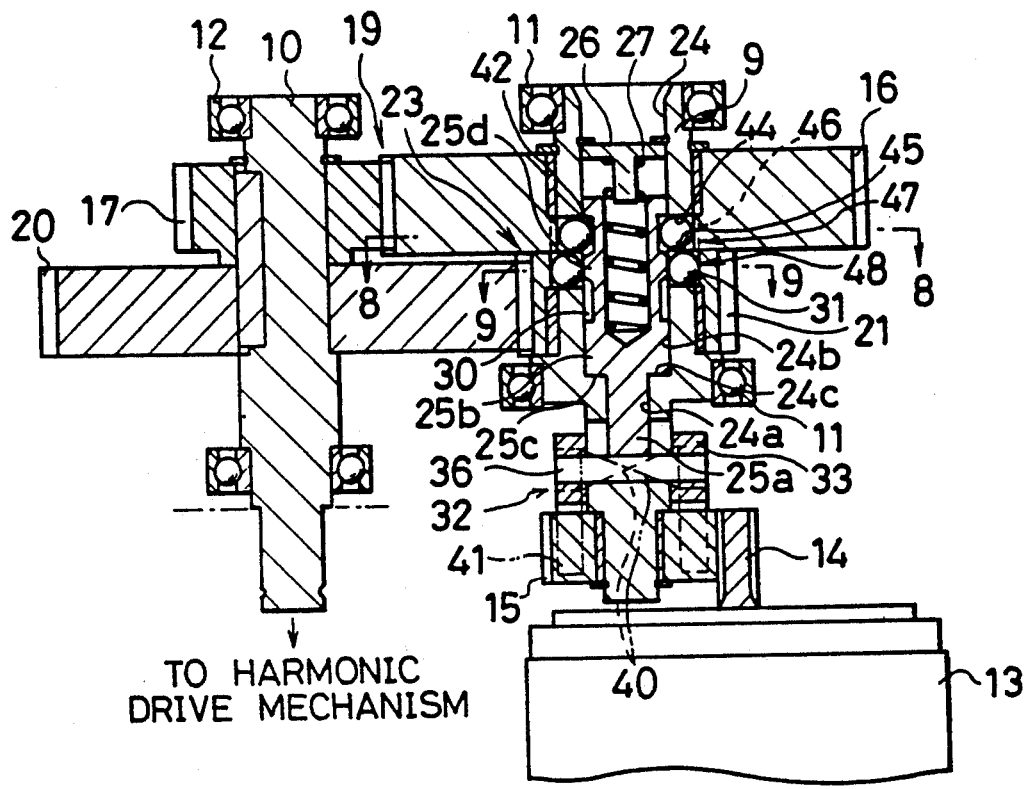
FIG. 7 is a horizontal cross-sectional view of the second embodiment of a quick return mechanism according to this invention, in the feed operation.
Figure 8:
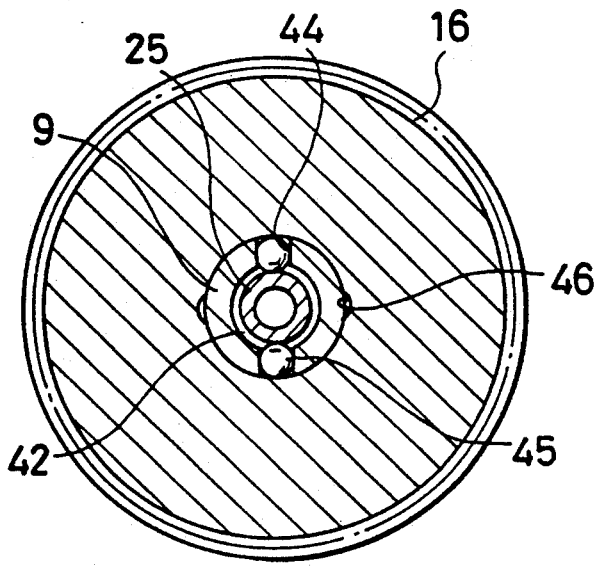
FIG. 8 is a cross-sectional view taken along line 8—8 of FIG. 7.
Figure 9:
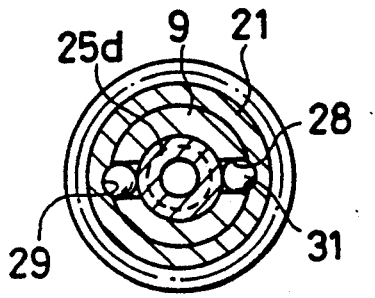
FIG. 9 is a cross-sectional view taken along line 9—9 of FIG. 7.

At the first position of the slide rod member 25, the balls 45 are received in the first grooved engaging portion 42 to disengage the first large gear 16 from the input shaft 9. At this point, however, the balls 31 are pushed by the clutch portion 25d and fitted in a pair of diametrically opposed depressed engaging portions 29 formed in the inner peripheral wall of a second small gear 21 (FIGS. 7 to 9).

At the second position of the slide rod member 25, the balls 45 are pressed by the clutch portion 25d and received in a pair of diametrically opposed depressed engaging portions 46 so as to connect the first large gear 16 to the input shaft 9, and the balls 31 are received in the second annularly grooved engaging portion 30 (FIGS. 10 to 12).

The slide rod member 25, the first annularly grooved engaging portion 42 thereof, the clutch portion 25d, the balls 45 in the first transverse hole portions 44 of the input shaft 9 and the depressed engaging portions 46 of the first large gear 16 constitute a clutch 47 for the over-drive gear train 19, i.e., a first clutch, and the slide rod member 25, the second annularly grooved engaging portion 30 thereof, the clutch portion 25d, the balls 31 in the second transverse hole portions 28 of the input shaft 9 and the depressed engaging portions 29 constitute a clutch 48 for the speed-reduction gear train 23, i.e., a second clutch.

Other parts and portions of the second embodiment are the same as those of the first embodiment, and are indicated by the same referential numerals in the first embodiment, and detailed description thereof is omitted.

The operation of the second embodiment will now be described.

Upon rotation of the electric motor 13 in the feed direction, the slide rod member 25 is set at the first position by a rotation=linear-movement converting unit 32, in the same manner as in the first embodiment. At the first position, the second small gear 20 is connected to the input shaft 9, while the first large gear 16 is disengaged therefrom. Thus, the rotation of the input shaft 9 in the feed direction is reduced in speed and transmitted to the output shaft 10 through the speed-reduction gear train 23 and feeds the electric drill 4 of the drilling machine.

After the electric drill 4 has completed drilling work, the electric motor 13 rotates in the quick-return direction, and the slide rod member 25 is set at the second position by the rotation=linear-movement converting unit 32. As has already been described, the first large gear 16 is connected to the input shaft 9, and the second small gear 20 is disengaged therefrom, at the second position. Consequently, the quick-return rotation of the input shaft 9 is increased in speed and transmitted to the output shaft 10 through the over-drive gear train 19, causing the electric drill 4 to return rapidly.

The relation between the rotational speeds and the rotating directions of the input shaft 9 and the output shaft 10 is the same in the first embodiment.

The number of transverse hole portions 28, transverse hole portions 44, depressed engaging portions 29 and depressed engaging portions 46, balls 31, the balls 45, projecting portions 37, inclined cam face portions 40 and slide pins 42 is two in the first and second embodiments, but it may be one or more than two.

What is claimed is:

1. A quick return mechanism for a drilling a machine, comprising:
   (1) a motor rotatable in a feed direction and a quick-return return direction opposite thereto;
   (2) an input shaft adapted to be rotated by said motor;
   (3) an output shaft rotatably provided in parallel to said input shaft;
   (4) an over-drive gear train comprising a first large gear coaxially mounted on said input shaft and a first small gear coaxially mounted on said output shaft and engaging said first large gear;
   (5) a speed-reduction gear train comprising a second small gear coaxially mounted on said input shaft and a second large gear coaxially fixed to said output shaft and engaging said first small gear;
   (6) a rotation=linear-movement converting unit rotated by said motor and rotating said input shaft, for converting rotation to a linear movement therealong;
   (7) a first clutch for connecting said output shaft to said input shaft through said over-drive gear train when said input shaft rotates in said quick-return direction; and
   (8) a second clutch selectively moved by said rotation=linear-movement converting unit to a first position and a second position, for connecting said second small gear to said input shaft at said first position in a feed operation, and disengaging said second small gear from said input shaft at said second position in a quick-return operation.

2. The quick return mechanism according to claim 1, wherein:
   (1) said first clutch comprises a one-way clutch disposed between said output shaft and said first small gear, for connecting said first small gear to said output shaft when said input shaft rotates in said quick-return direction; and (2) said second clutch comprises at least one depressed engaging portion formed in an inner peripheral wall of said second small gear, at least one transverse hole portion extending through said input shaft, in alignment with said depressed engaging portion, a ball fitted in said transverse hole portion, a slide rod member provided in said input shaft and set at said first position when said input shaft is rotated in said feed direction and at said second position when said input shaft is rotated in said quick-return direction, said slide rod member comprising a cylindrical latch portion provided so as to face said transverse hole portion at said first position, for pressing said ball into said depressed engaging portion, a grooved engaging portion provided so as to face said transverse hole portion at said second position, for receiving said ball.

3. The quick return mechanism according to claim 2, wherein said rotation=linear-movement converting unit comprises:

(1) a slide ring rotatable around an axis thereof together with said input shaft and slidable therealong and having two ends, one end being always in contact with one end of said slide rod member, said slide ring being provided with
  (a) at least one projecting portion extending axially of said slide ring from the other end thereof and having two parallel planes defining both sides thereof, and
  (b) at least one inclined cam face portion extending from said plane oriented toward said feed direction to said plane oriented opposite to said feed direction, such that said inclined cam face portion is gradually separated from said other end of said slide ring to define a lift substantially equal to a distance between said first and second positions; and (2) at least one slide pin extending axially of said slide ring and rotated around said axis of said slide ring by said motor, said slide pin being in contact with said inclined cam face portion and engageable with said two planes selectively, according to a direction of rotation of said slide pin.

4. The quick return mechanism according to claim 1, wherein:

(1) said first large gear has an inner peripheral wall formed with at least one first depressed engaging portion;

(2) said second small gear has an inner peripheral wall formed with at least one second depressed engaging portion;

(3) said input shaft has at least one first transverse hole portion for receiving a first ball, and radially extending through said input shaft and being in alignment with said first depressed engaging portion, and at least one second transverse hole portion for receiving a second ball, and radially extending through said input shaft and being in alignment with said second depressed engaging portion;

(4) said slide rod member is provided in said input shaft and set, by said rotation=linear-movement converting unit, at said first position when said input shaft is rotated in said feed direction and at said second position when said input shaft is rotated in said quick-return direction, said slide rod member having
  (a) a first annularly grooved engaging portion aligned with said first transverse hole portion at said first position, for receiving said first ball,
  (b) a clutch portion aligned with said second transverse hole portion at said first position, for pressing said second ball to cause said second ball to be fitted in said second depressed engaging portion, and aligned with said first transverse hole portion at said second position, for pressing said first ball to cause said first ball to be fitted in said first depressed engaging portion, and
  (c) a second annularly grooved engaging portion aligned with said second depressed engaging portion at said second position, for receiving said second ball;

(5) said first clutch comprises said slide rod member, said first annularly grooved engaging portion, said clutch portion, said first ball, and said first depressed engaging portion; and (6) said second clutch comprises said slide rod member, said second annularly grooved engaging portion, said clutch portion, said second ball, and said second depressed engaging portion.

5. The quick return mechanism according to claim 4, wherein said rotation=linear-movement converting unit comprises:

(1) a slide ring rotatable around an axis thereof together with said input shaft and slidable therealong, and having one end always in contact with one end of said slide rod member, said slide ring being provided with
  (a) at least one projecting portion extending axially of said slide ring from the other end thereof and having two parallel planes defining both sides thereof, and
  (b) at least one inclined cam face portion extending from said plane oriented toward said feed direction to said plane oriented opposite to said feed direction such that said inclined cam face portion is gradually separated from said other end of said slide ring to define a lift substantially equal to a distance between said first and second positions; and (2) at least one slide pin extending axially of said slide ring and rotated around said axis of said slide ring by said motor, said slide pin being in contact with said inclined cam face portion and engageable with said two planes selectively, according to a direction of rotation of said slide pin.

* * * * *